INVENTOR.
ROBERT G. FRIEDMAN

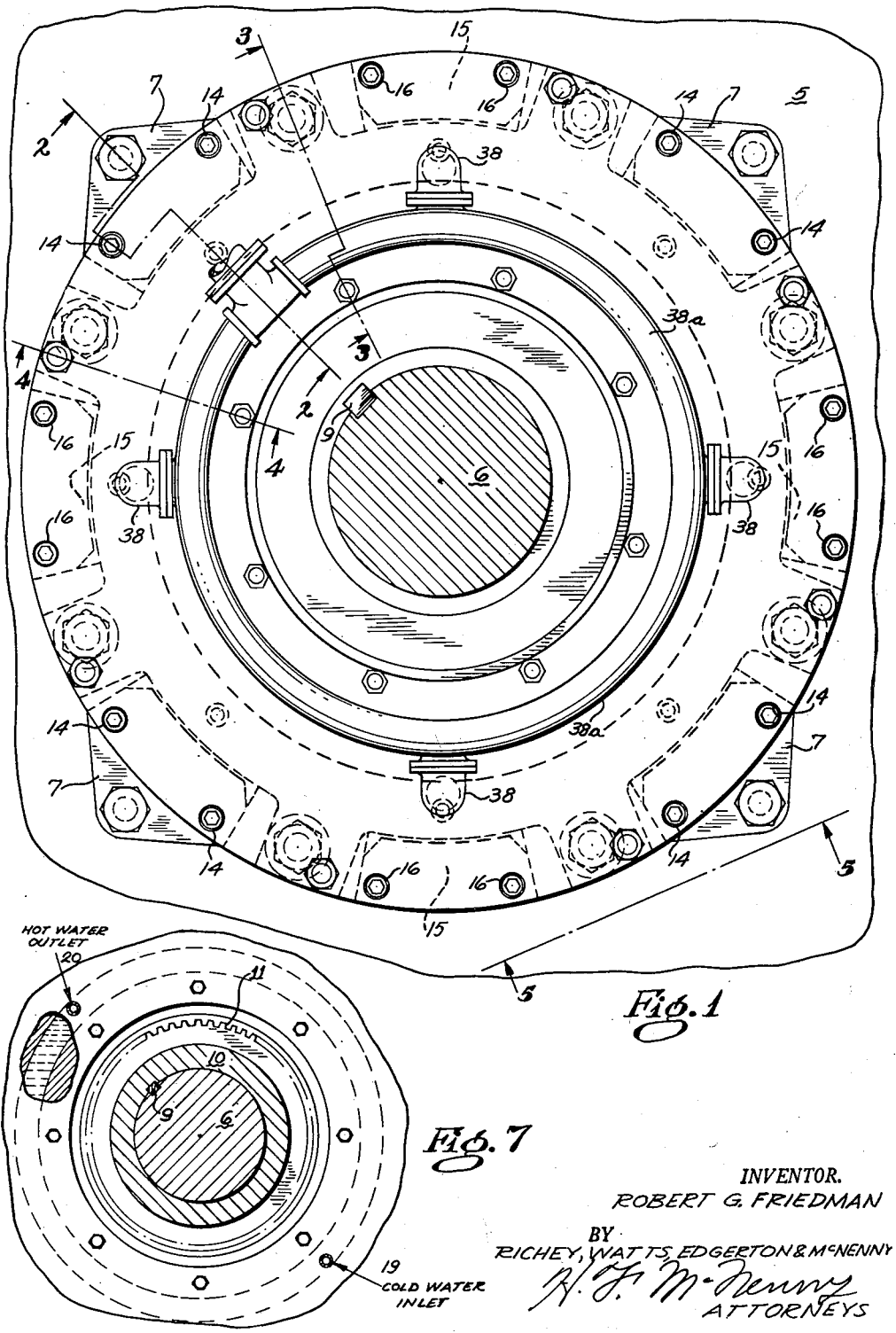

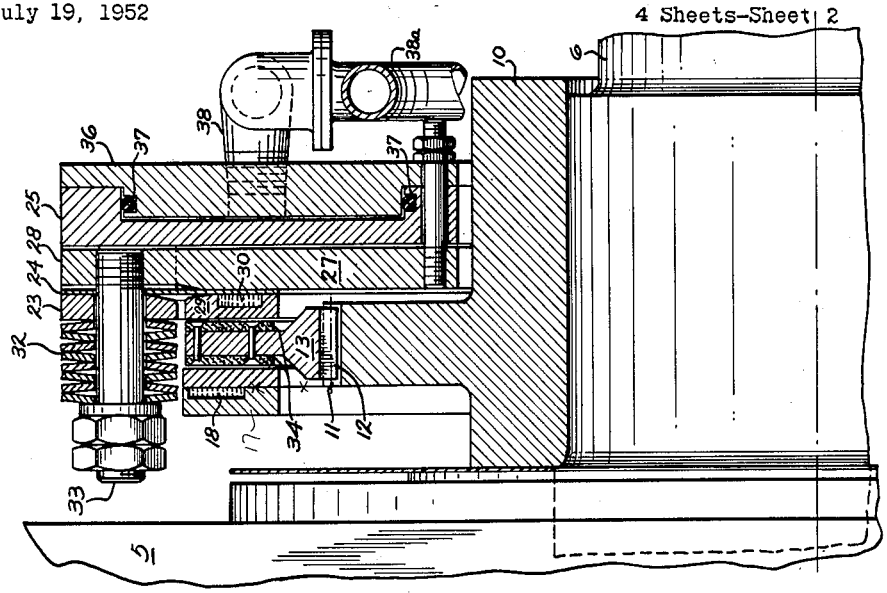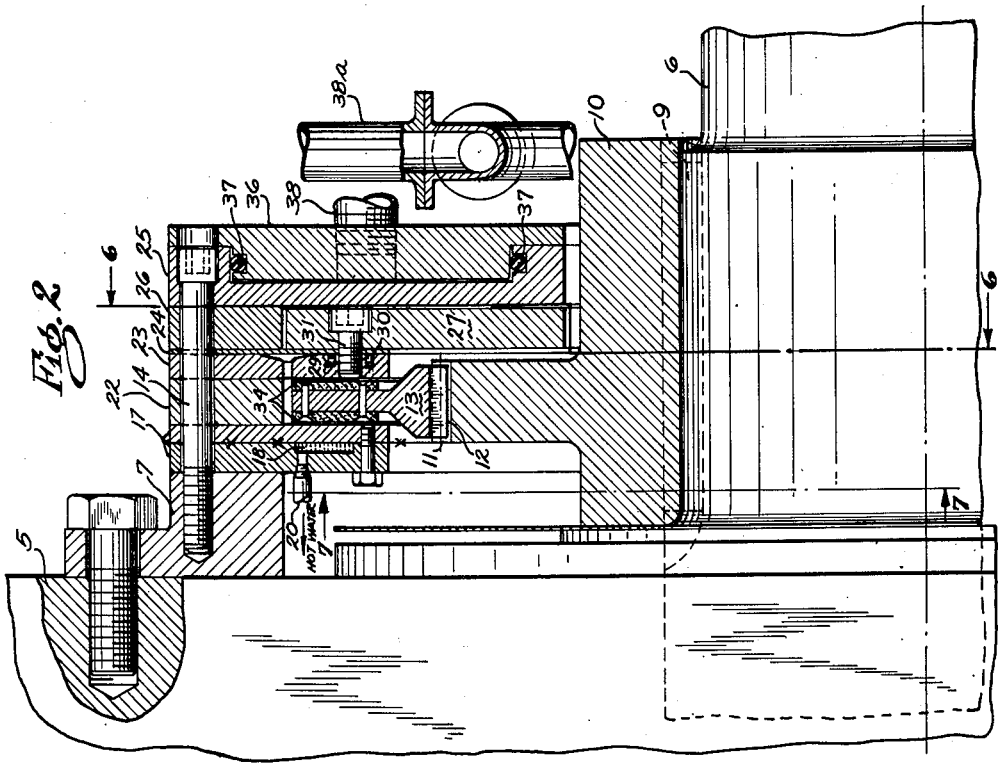

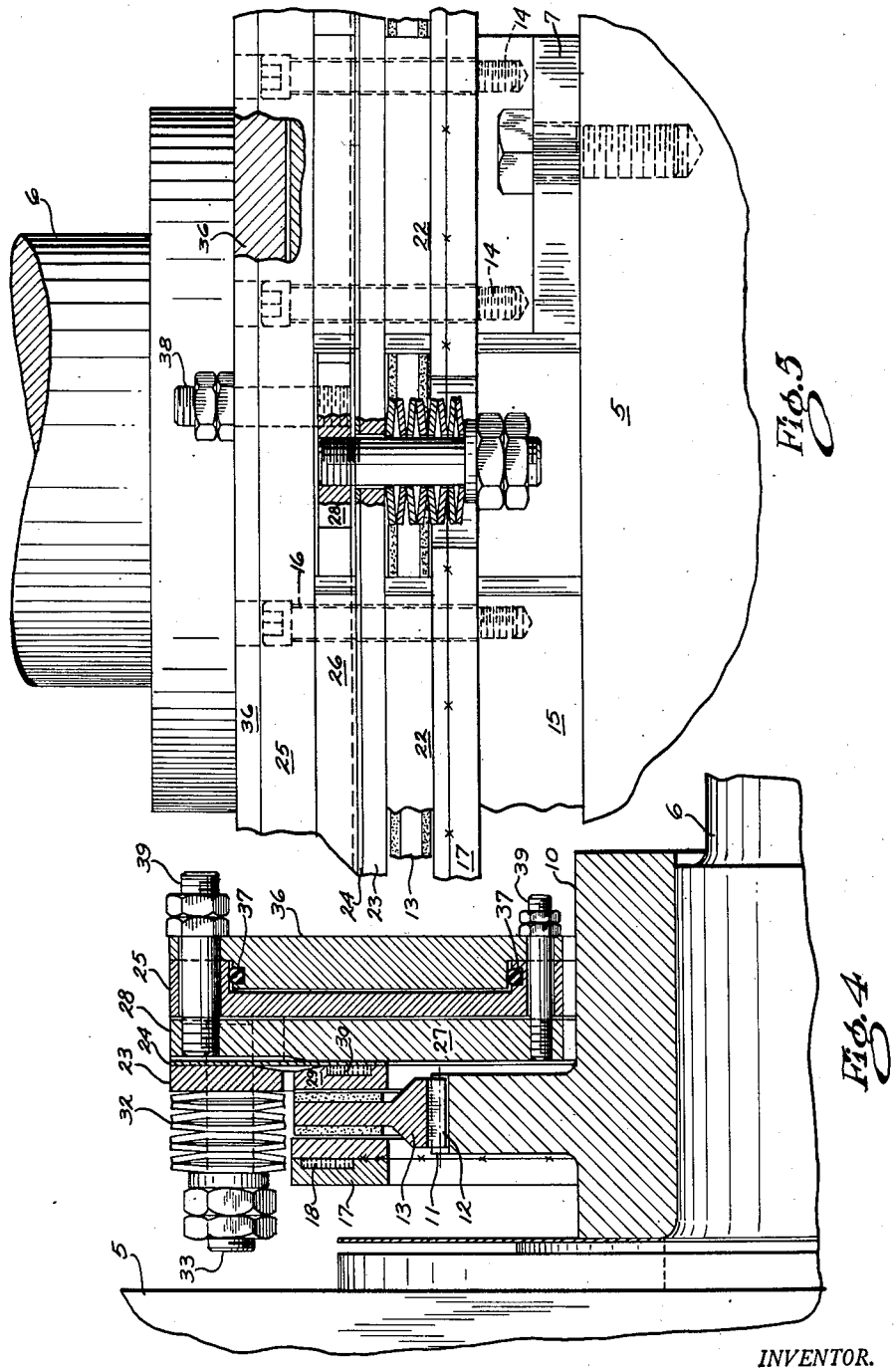

BY
RICHEY, WATTS, EDGERTON & McNENNY
ATTORNEYS

United States Patent Office 2,775,319
Patented Dec. 25, 1956

2,775,319

SPRING APPLIED WHEEL BRAKE

Robert G. Friedman, Tiffin, Ohio, assignor to The National Machinery Company, Tiffin, Ohio, a corporation of Ohio Application July 19, 1952, Serial No. 299,889

3 Claims. (Cl. 188—170)

This invention relates to brakes, and more particularly a brake for heavy machinery such as metal working presses and the like. It is the principal object of this invention to provide a brake for use in heavy machines wherein at least part of the torque absorbed by the brake is transmitted from the rotational member to the stationary member by a thin metal diaphragm which is relatively flexible within its elastic limit, along its axis but capable of withstanding high torsional stresses in its plane without appreciable deformation.

Another object of this invention is to provide a disc brake for heavy machines such as metal working presses and the like wherein the rotatable parts are gripped and held for braking action by spring means and wherein said spring means are overcome by fluid pressure when released.

It is also among the objects of this invention to provide a brake according to the preceding objects wherein fluid (such as water) is utilized for cooling the brake and fluid pressure (such as air) is utilized for releasing the brake. It is also among the objects of this invention to provide a brake which is compact, efficient and is characterized by long life and low cost of manufacture. Further objects and advantages will appear from the following description and the appended drawings, wherein:

Fig. 1 is an elevation showing a brake according to this invention applied to a forging press;

Fig. 2 is an elevation with parts in section taken on the plane 2—2 of Fig. 1;

Fig. 3 is an elevation with parts in section taken on the plane 3—3 as indicated in Fig. 1;

Fig. 4 is an elevation in section taken on the plane 4—4 of Fig. 1;

Fig. 5 is an elevation taken along the side of the press showing parts in section embodied in this invention;

Fig. 7 is a view taken along 7—7 of Fig. 2 partially in section.

Figure 6:
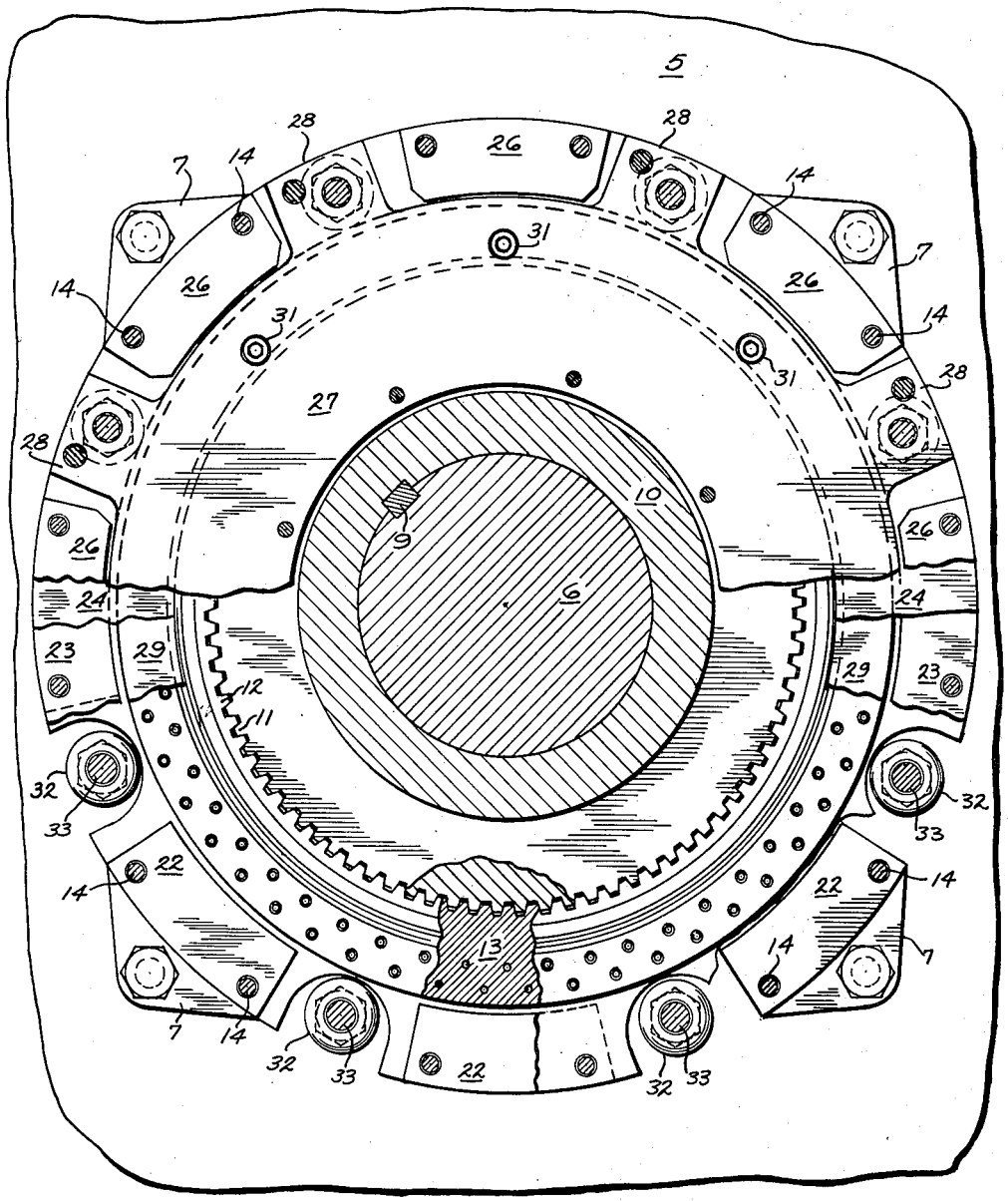
Fig. 6 is a plan view similar to Fig. 1 with parts broken away to show the mounting for the brake.

Heretofore the heavy machine art, such as metal forging presses and the like has been characterized by band brakes and other conventional types of brakes. It is desirable in the forging machine art that the brakes provided be of simple construction positive in operation and easily assembled and disassembled. According to the preferred embodiment of the present invention, the brake embodies a pair of co-acting braking rings which are arranged to embrace opposed sides of a rotatable member carried by the crankshaft of the press. Said rings are brought toward each other to grip the rotatable member by spring means and are separated from each other by an annular fluid pressure piston means.

Referring to the drawings, 5 indicates the bed frame of a forging press having a crankshaft 6 projecting therefrom. It is characteristic of forging presses that they operate in a cyclic fashion, that is, each revolution of the crankshaft 6 effects a forging operation and that the machine is brought to rest after each forging operation. The accuracy and efficiency of the braking is frequently a measure of the effectiveness of the forging machine. To support the brake, four spaced feet or lugs 7 are carried by the bed frame and the braking torque is transmitted to the bed frame by the feet or lugs 7.

The crankshaft 6 has keyed to it as at 9 the member 10 with an annular flange having a spline 11 at its periphery. Friction ring 13 is provided with another spline 12 at its inner periphery which matches and engages the spline 11. This mounting of the friction ring 13 holds the ring 13 against rotation with respect to the member 10 but permits it to slide axially or "float" relative to the member 10. The brake actuating mechanism is composed of several ring and spacer elements which are stacked and held in intimate contact by the bolts 14 thereby forming a rigid non-rotatable assembly. Between the feet 7 are inner spacers 15 that serve as anchors for the bolts 16 which in addition to the bolts 14 hold the elements of the actuating mechanism together. Situated adjacent to the feet 7 and the inner spacers 15 is the base ring 17 which in the preferred embodiment is formed of two substantially annular elements permanently united into the ring 17. Before these elements are joined an annular groove 18 is formed in one element opening on the surface adjacent to the second element. When the two elements are joined, the groove, which is then totally enclosed, forms a cavity through which a coolant, such as water, may be circulated. Inlet and outlet ports 19 and 20 may be employed to permit the above circulation of the coolant. Adjacent to the base ring are a plurality of intermediate spacers 22 spaced around the circumference of the radial face of the base ring 17. Adjacent to the intermediate spacer is the substantially annular support ring 23. An apertured metal diaphragm 24 is compressed along its outer edge between the support ring 23 and the outer spacers 26 which, in turn, abuts against the air cylinder 25. Since the bolts 14 and 16 pass through all of these elements they form a non-rotatable assembly and there is no relative motion either between the individual elements or between the assembly and the bed 5.

A substantially annular pressure plate 27 having projections 28 which extend to the circumference of the assembly through the spaces between the outer spacers 26 together with the substantially annular ring shoe 29 is clamped against the opposing radial surface of the diaphragm along its inner edge and are axially movable due to the inherent axial flexibility of the diaphragm 24. A groove 30 is formed in the outer face of the ring shoe 29 which is enclosed by the diaphragm thereby forming a fluid passage through which a coolant may be circulated to cool the ring shoe. A plurality of bolts 31 provide for the positive clamping of the pressure plate 27, diaphragm 24, and the ring shoe 29 so there is no relative motion between these elements along the area of their engagement.

The friction ring 13 projects between the base ring 17 and the ring shoe 29, thus providing friction surfaces which are brought into engagement when the ring shoe 29 is moved axially toward the friction ring. In the preferred embodiment of this invention there is a plurality of springs 32 spaced around the outer edge of the support ring which are held in compression by the bolts 33 which protrude through said support ring and are anchored in the projections 28 of the pressure plate 27. The springs 32 are arranged so that they apply tension to the bolts 33 which in turn through the projection 28 move the pressure plate 27 axially toward the support ring 23 thereby causing the ring shoe to engage the radial surface of the friction plate 13. Since the friction plate is free to move axially or "float" relative to the member 10, it slides axially under the force exerted by the ring shoe and engages the base ring 17. It should be noted that the relationship between the radial dimension of the diaphragm and the extent of the movement of the ring shoe 29 from the released to the engaged position is such that the deformation of the diaphragm is within its elastic limit. By providing these two friction surfaces which oppose each other the resulting thrust is cancelled without any axial forces on the bearings of the crankshaft 6 and the braking is substantially twice as great as would be provided if only one surface were employed. It will be understood that a plurality of these friction plates could be spaced between intermediate non-rotatable rings and that such a device would be within the scope of this invention.

In the preferred embodiment the radial surface of the friction plate 13 which projects between the ring shoe 29 and the base ring 17 are lined with a friction material 34 which can be firmly attached to the friction plate by means of rivets. The purpose of the friction material 34 is to provide a friction surface having a desirable coefficient of friction as well as good wearing properties.

In order to release the brake a fluid cylinder, which in a preferred embodiment is an air cylinder, is provided to cancel the thrust of the spring 32 when the brake is to be released so that the shaft 6 may be free to rotate. An annular piston member 36 fits into the annular cylinder 25 and is provided with packing 37 which forms a seal between the piston and the cylinder. A plurality of fluid inlets 38 connected to a header 38a are spaced around the piston to provide fast action when the fluid is admitted into the cylinder and insures uniform admittance and release of the fluid pressure. The piston 36 is attached to the pressure plate 27 by means of the bolts 39 which pass through the cylinder 25 and anchor in the pressure plate.

It will be understood that when fluid is admitted in the cylinder, the fluid pressure causes the piston to move axially away from the cylinder which in turn through the bolts 33 and 39 cause the pressure plate to move in the same direction compressing the springs 32. The pressure plate 27 moves axially with the piston and the ring shoe 29 also moves axially away from frictional engagement with the friction plate 13. Since the friction plate "floats" on the member 10, the release of the axial thrust of the ring shoe permits the friction plate to slide axially away from the base ring 17 thus releasing the frictional engagement of all members.

When the fluid pressure is released, the fluid thrust developed on the piston is necessarily released and the springs 32 force the ring shoe 29 back into engagement with the friction plate thus setting the brake. The introduction and exhaust of the air with respect to the brake cylinder is controlled by foot treadle means actuated by the operator. The particular control valves are not shown here and form no essential part of the present invention.

From the above description it can be seen that the base ring 17 is firmly mounted and secured against movement by the bolts 14 but the ring shoe 29 must be permitted to move axially with as little resistance as possible even though it is secured against any rotation. The thin annular diaphragm 24 is ideal for this purpose since it may be subjected to extremely large rotational forces without appreciable deformation because such forces are in the plane of the diaphragm while it only provides a small resistance to the axial deformation within the limits of motion necessary in this application. If a conventional sliding coupling such as a spline were used to prevent the rotation of the ring shoe there would be large frictional forces operating against the axial motion particularly when the ring shoe and the friction plate first enter into engagement. Still another advantage is derived from the use of the diaphragm means of coupling instead of the conventional sliding coupling such as a spline in that the possible vibration during the engaging of the friction members is reduced considerably. In the normal spline-type coupling the frictional resistance from point to point about the circumference often varies causing a tendency to cock the friction member first in one direction and then in another which tends to produce chattering and extremely large shock loads on the engaging surfaces. Some clearance necessarily exists between such sliding parts and this clearance is rapidly increased due to wear resulting from the above-mentioned chattering. All such detrimental action is avoided by the present invention because the resistance against movement of the engaging surfaces created by the axially flexible diaphragm is uniformly distributed about the entire circumference and is not increased or varied by the fact that torque is also transmitted through the diaphragm. In other words, since there is no sliding friction resisting the movement of the ring shoe and since the distribution of any axial force is not increased or varied by the torque transmitted through the diaphragm a smooth action is accomplished during the engagement and disengagement of the ring shoe with the friction ring.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A brake for a shaft mounted on a frame and projecting therefrom comprising a rotatable brake member mounted on said projecting shaft for rotation therewith having an annular brake section, a stationary brake ring mounted on said frame between said frame and brake member having a face adjacent to one side of said annular section, an axially movable brake ring adjacent to the other side of said annular section remote from said frame, mounting means mounting said axially movable brake ring on said frame axially movable and rotatably fixed relative thereto, spring means radially spaced from and radially aligned with said rotatable member urging said movable ring toward said member, and fluid motor means on the other side of said axially movable ring remote from said frame operably connected to said axially movable brake ring for over-coming said springs and moving said axially movable brake ring away from said rotatable member.

2. A brake for a shaft mounted on a frame and projecting therefrom comprising a rotatable brake member mounted on said projecting shaft for rotation therewith having an annular brake section, said member being rotatably fixed and axially slidable relative to said shaft, a stationary brake ring mounted on said frame between said frame and brake member having a face adjacent to one side of said annular section, an axially movable brake ring adjacent to the other side of said annular section remote from said frame, mounting means mounting said axially movable brake ring on said frame axially movable and rotatably fixed relative thereto, spring means radially spaced from and radially aligned with said rotatable member urging said movable ring toward said member, and fluid motor means on the side of said axially movable ring remote from said frame operably connected to said axially movable brake ring for over-coming said springs and moving said axially movable brake ring away from said rotatable member.

3. A brake for a shaft mounted on a frame and projecting therefrom comprising a rotatable brake member mounted on said projecting shaft for rotation therewith having an annular brake section, a stationary brake ring mounted on said frame between said frame and brake member having a face adjacent to one side of said annular section, an axially movable brake ring adjacent to the other side of said annular section remote from said frame, diaphragm means mounting said axially movable brake ring on said frame axially movable and rotatably fixed relative thereto, spring means radially spaced from and radially aligned with said rotatable member urging said movable ring toward said member, and fluid motor means on the side of said axially movable ring remote from said frame operably connected to said axially movable brake ring for overcoming said springs and moving said axially movable brake ring away from said rotatable member.

References Cited in the file of this patent

UNITED STATES PATENTS

| | | |
|---|---|---|
| 1,131,810 | Zoller et al. | Mar. 16, 1915 |
| 1,859,280 | Corbin | May 24, 1932 |
| 2,009,301 | Rode et al. | July 23, 1935 |
| 2,242,396 | Johansen | May 20, 1941 |
| 2,436,968 | Longfield | Mar. 2, 1948 |
| 2,584,191 | Danly et al. | Feb. 5, 1952 |
| 2,584,192 | Danly et al. | Feb. 5, 1952 |

FOREIGN PATENTS

| | | |
|---|---|---|
| 646,128 | Great Britain | July 15, 1946 |